March 29, 1966 L. C. JOHNSON 3,243,303
TEMPERATURE MONITOR EMPLOYING A FLOWABLE AQUEOUS COMPOSITION
CONTAINING DISPERSED POLYVINYL ACETATE AS A FLOW RETARDANT
Filed June 27, 1962 2 Sheets-Sheet 1
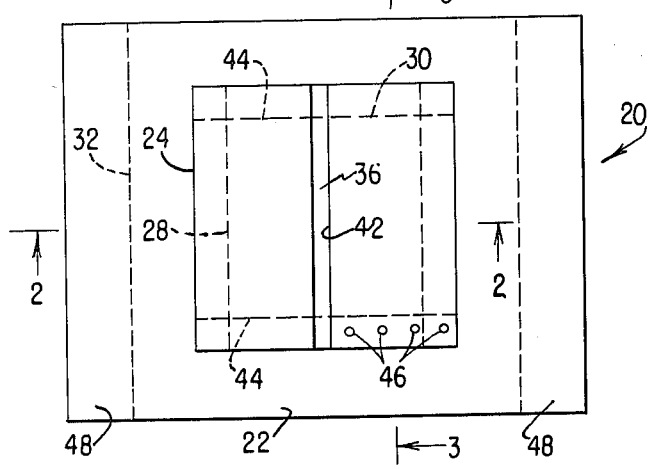
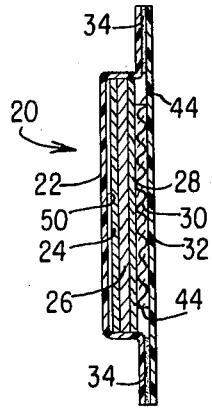
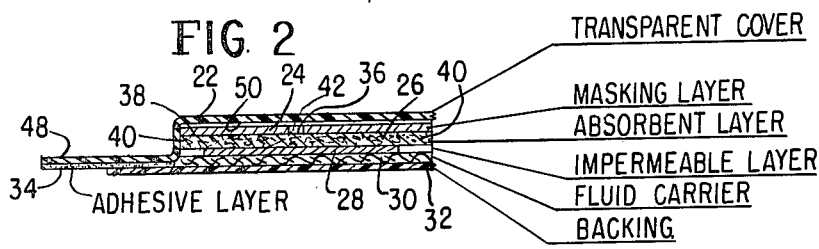
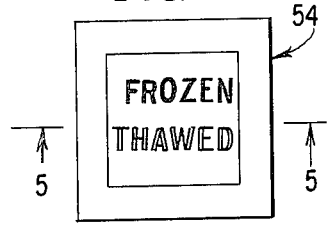
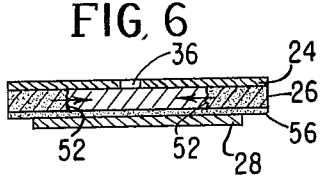
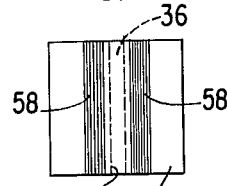
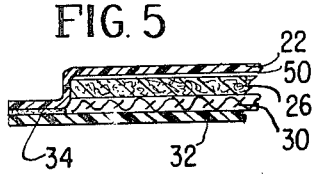
INVENTOR.
Leighton C. Johnson
BY
John S. O'Brien
ATTYS.

INVENTOR.
Leighton C. Johnson
BY
John S. O'Brien
ATTYS.

United States Patent Office 3,243,303
Patented Mar. 29, 1966

3,243,303
TEMPERATURE MONITOR EMPLOYING A FLOW
ABLE AQUEOUS COMPOSITION CONTAINING
DISPERSED POLYVINYL ACETATE AS A FLOW
RETARDANT
Leighton C. Johnson, 233 S. Hudson, Westmont, Ill.
Filed June 27, 1962, Ser. No. 205,735
10 Claims. (Cl. 99—192)

This invention relates to temperature monitors, and more particularly, to an indicating device which records the temperature history of an article to which it is attached.

Frozen foods and similar products are being marketed in ever increasing kinds and quantities, with accompanying increased problems of care and preservation of the products in packaging, storing, shipping, and displaying them. Temperature variations may be encountered which affect the appearance, quality, and preservation of the products. It is often not possible to detect the occurrence of such variations before the goods are acquired by the ultimate purchaser and possibly consumed. Consequently, there is a substantial need for effective means of guaranteeing the condition of the products and of identifying products which have not been maintained completely within prescribed limits for handling and storage. To be truly effective, each unit or package must be provided with such means of protection, and the cost thereof must be very low in order to be practicable.

It, therefore, is an important object of the present invention to provide a temperature monitor or indicating device which supplies the foregoing needs, and particularly, which effectively indicates and permanently records the temperature history of a product to which it is attached. A further object is to provide a temperature monitor which records the time-temperature experience of the product.

Another object is to provide a simple, compact, and very economical temperature monitor which can be manufactured and affixed to each article or package of frozen food or the like to be sold and distributed, readily and with standard equipment.

An additional object is to provide a temperature monitor which is variable to suit the circumstances of use and the requirements of the product.

A further object is to provide a temperature monitor which serves to indicate the condition of the product at every stage of handling, from initial packaging to consumption. A particular object is to provide a positive color indication of when the temperature conditions for the goods have been exceeded.

These and other objects, advantages, and functions of the invention will be apparent on reference to the specification and to the attached drawings illustrating preferred embodiments of the invention, in which like elements are identified by like reference symbols in each of the views, and in which:

FIGURE 1 is a top plan view of one embodiment of the new temperature monitor, enlarged with respect to the size of the presently preferred device;

FIG. 2 is a partial longitudinal cross-sectional view thereof taken on line 2—2 of FIG. 1, the thicknesses being exaggerated for purposes of illustration;

FIG. 3 is a transverse cross-sectional view thereof taken on line 3—3 of FIG. 1;

FIG. 4 is a plan view of another embodiment of the temperature monitor, showing a preferred size drawn approximately to scale;

FIG. 5 is an enlarged fragmentary cross-sectional view thereof taken on line 5—5 of FIG. 4;

FIG. 6 is a cross-sectional view like FIG. 2 of several associated elements in a modified form of the temperature monitor of FIG. 1;

FIG. 7 is a bottom plan view on a smaller scale illustrating several elements in a further modification of the temperature monitor;

Figure 9:
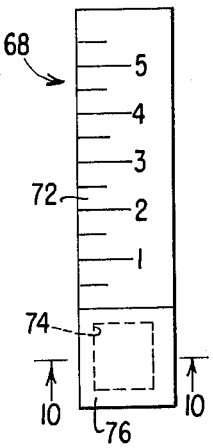
Figure 11:
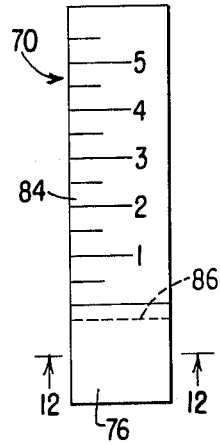
Figure 13:
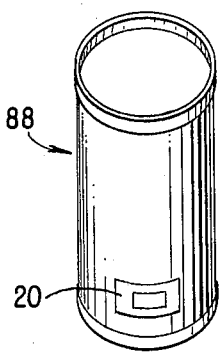
Figure 10:
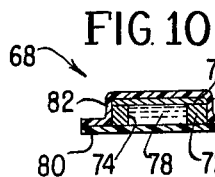
Figure 12:
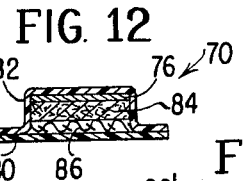
Figure 15:
Figure 14:
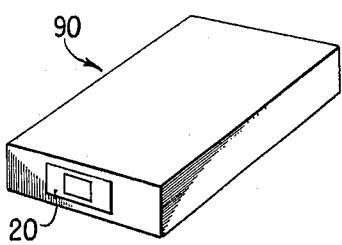
Figure 16:
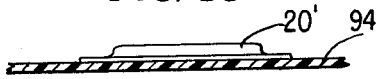

FIGS. 9 and 11 are respectively top plan views of elements of two additional embodiments of the temperature monitor, and FIGS. 10 and 12 are cross-sectional views of the complete monitors, taken on lines 10—10 and 12—12 of respective FIGS. 9 and 11;

FIGS. 13–15 are illustrative of the use of the temperature monitor on canned goods, packaged goods, and wrapped goods, respectively; and FIG. 16 is a sectional and elevational view illustrating one manner of constructing and applying a temperature monitor to the goods of FIG. 15.

In certain of its broader aspects, the new temperature monitor of the invention includes an absorbent body having an indicating area on a surface thereof, and a fluid composition for producing a visual indication at the indicating area. The fluid composition preferably is arranged for absorption by the absorbent body at a zone remote from the indicating area, and the fluid composition travels to the indicating area under certain temperature conditions and provides a visual indication thereat. In a preferred form of the invention, the fluid composition exists in an immobile state below a predetermined temperature and in a fluid state thereat, and a color change is produced by the composition at the indicating area upon reaching the temperature at which the composition is fluid.

The preferred embodiments of the temperature monitor are complete self-contained monitoring packages or packets which may be affixed to frozen foods or other items, to monitor the time-temperature experience thereof. The monitor may be placed directly on the goods or on packaging or wrapping thereover, in a manner which maintains it in heat-transmitting relation to the goods. It is also contemplated that the monitor may be placed in other locations, such as in containers or vessels holding a number of articles, in storage rooms and cabinets, and in other locations or on other articles for which a temperature record would be advantageous.

Referring to the drawings, a preferred embodiment of the temperature monitor is generally indicated by the number 20 in FIGS. 1–3. As indicated by the legends in FIG. 2, this embodiment includes a transparent or light-transmitting cover or outer layer 22, a masking layer 24, an absorbent layer 26, an impermeable layer or barrier 28, a fluid carrier 30, a backing 32, and a marginal adhesive layer 34. The fluid carrier 30 is a relatively porous absorbent material which serves as a reservoir for a fluid composition layer thereon. The fluid composition serves ultimately to produce a color change at a central indicating area 36 on the upper or outer surface of the absorbent layer 26.

In this embodiment, the fluid carrier 30 is impregnated with a fluid composition which includes a coloring material. Initially, the fluid composition preferably is rendered immobile, such as by freezing. When the composition melts or thaws, it is absorbed by the absorbent layer 26. A time lag is introduced between absorption by the layer 26 and indication at the area 36 thereon, by the interposition of the impermeable layer 28 between the fluid composition layer in the carrier 30 and the absorbent layer 26. The impermeable layer serves as a barrier to prevent absorption at all but the opposite end zones 40 of the absorbent layer, which zones extend beyond the impermeable layer and are in contact with the fluid carrier 30. Consequently, absorption takes place at the end zones 40 remote from the central indicating area 36, and the fluid travels through the absorbent layer from both ends until it reaches the indicating area. A color line or front due to the coloring matter in the composition thus travels progressively over the upper surface 38 of the absorbent layer and reaches the indicating area after a period of time. The masking layer 24 obscures the absorbent layer and the color change taking place therein until the fluid reaches a central transverse opening 42 in the masking layer, which opening registers with the indicating area 36. At this time, the color change provides a visual indication which is seen through the transparent cover 22.

The fluid carrier 30 is impregnated with sufficient fluid composition to more than saturate the absorbent layer 26. The absorbent layer preferably has greater absorptive power than the fluid carrier, the latter preferably being more porous, so that the absorbent layer readily takes up the fluid. The fluid carrier provides a holder and conduit for the fluid, although as will be seen in connection with a subsequent embodiment, it is possible to dispense with the carrier. The side margins 44 of the fluid carrier in this embodiment preferably are spaced inwardly from the margins of the absorbent layer 26, as seen in FIGS. 1 and 3, to avoid inadvertent color indication at the ends of the indicating area 36. This may also be avoided in other ways, such as by extending the masking layer 24 to close the opening 42 at the opposite ends, or by limiting the indicating opening to the center of the masking layer as in the embodiment of FIG. 8. In this connection, it will be noted that the impermeable layer 28 extends laterally beyond the fluid carrier 30, to the side margins of the absorbent layer 26.

The masking layer 24 may be provided with a coded series of indicating openings 46 arranged in a row extending in the longitudinal direction. The openings serve to indicate to the supplier the condition of the goods on which the monitor 20 is affixed, before a color change is produced at the principal indicating area 36.

The cover 22 and the backing 32 provide an impermeable envelope which maintains the components of the monitor in their proper assembled relation and retains the fluid composition therein. The envelope is sealed by the adhesive layer 34, which joins the cover to the backing on all sides and adjacent to the edges of the contents. The opposite ends of the cover 22 and the adhesive layer 34 thereon may be extended to provide tabs or tab portions 48 for securing the device in place on an object to be monitored. The backing 32 is in contact with the surface of the object, and the cover 22 is arranged for viewing the indicating area 36 therethrough.

The cover 22 preferably rests loosely on the upper surface of the masking layer 24, to provide for internal venting as the fluid composition travels through the absorbent layer 26. An air space 50 then may be formed between the cover and masking layer, permitting the movement of displaced air to the sides of the envelope and preventing air binding.

In constructing the temperature monitor 20, the absorbent layer 26 may constitute blotting paper or the like, which furnishes a color contrast to the coloring material. The masking layer 24 may constitute an opaque sheet material, coat or film. A hydrophobic printing ink provides a very effective masking layer, and it may be printed on the upper surface 38 of the absorbent layer readily and economically. Similarly, the impermeable layer 28 may constitute a hydrophobic printing ink. Alternatively, an impermeable sheet or film of plastic material may be secured on the lower surface of the absorbent layer. A preferred material for the fluid carrier 30 is gauze or the like. The cover 22 and the backing 32 may be constructed of available plastic sheet materials, such as cellophane, Saran, polyethylene, and fluorocarbon resin materials, the latter having especially low vapor permeabilities. The cover and the backing may be secured together in suitable ways other than by the above-described adhesive bonding. For example, they may be joined by heat or solvent welding where appropriate.

The fluid composition preferably is of a type that may be rendered immobile at a predetermined temperature, below which the monitor does not function and above which it functions to provide a color indication. However, it is contemplated that the composition need not be immobilized in certain instances, but will function continually to provide an indication after a predetermined period of time. Aqueous compositions are preferred, further preferably compositions which may be compounded so as to exist in a solid or semi-solid state at a predetermined temperature at or below the freezing point of water. Thus, for example, the compositions may have predetermined freezing or gel points. The freezing points may be varied by the incorporation of freezing point depressants. A solid or semi-solid state may be achieved at higher temperatures by incorporating gelatinous materials, soaps and the like.

As noted above, a time lag may be introduced by providing an extended flow path for the fluid composition, whereby an indication may be delayed until a predetermined temperature has existed for a period of time. It is preferred to further include a flow retardant in the fluid composition to increase the effectiveness and utility of the monitor. Such material may perform another function, such as that of regulating the solidification point. The flow retardant may function by increasing the viscosity of the composition, providing an obstruction to flow, or in other ways. It is further preferred to employ a flow retardant which functions dependently on the temperature of the fluid composition. This condition makes it possible to simulate the functioning of the temperature monitor to the condition of the goods being monitored over a varied temperature history, and numerous combinations of time and temperature may be achieved.

Preferred flow retardants include finely dispersed polymers, further preferably polymers having adhesive characteristics in aqueous dispersion. Especially valuable results have been achieved employing polymers of vinyl acetate as commonly employed in aqueous adhesive compositions referred to as white glue. The rate of flow of the fluid composition decreases and the period of time required for an indication increases as the concentration of vinyl acetate polymer increases. The flow rate increases and the indication time decreases as the temperature increases. The vinyl acetate polymers may be provided in a wide range of concentrations in aqueous dispersion, and freezing point depressants, such as ethanol, may be included in the compositions. The compositions function over a relatively wide temperature range, from temperatures below the freezing points of foodstuffs up through the ambient temperatures encountered. The time-temperature indications furnished are reliable and reproducible at the various temperatures and concentrations, so that temperature monitors may be provided which are suitable for many and varied monitoring requirements.

In the embodiment of FIGS. 1–3, the fluid composition also contains a coloring matter. Any suitable coloring matter may be employed, such as a vegetable dye. It is preferred to employ a U.S. certified food color, and in particular, a red color which furnishes a significant visual contrast with the preferably white absorbent layer 26. Alternatively, the coloring matter may be incorporated in the monitor in other ways, with the fluid composition conducting the coloring matter to the indicating area 36 or activating it thereat. For example, the coloring matter may be placed on the under surface of the absorbent layer 26, as subsequently described with reference to FIGS. 6 and 7.

In manufacturing the temperature monitor 20, absorbent sheet material may be printed on both sides or otherwise provided with masking and impermeable layers, to provide the component masking, absorbent and impermeable layers 24, 26, and 28, respectively. Absorbent fabric or sheet material for the fluid carrier 30 may be impregnated with a desired fluid composition and brought together with the foregoing components with the composition in the fluid or in the immobile state. The components are enclosed by and sealed between the cover 22 and the backing 32. When the package is assembled with the composition in the fluid state, it is next immediately subjected to conditions which immobilize the fluid carrier. For example, the packages may be quick-frozen. In another alternative, all of the components except for the fluid composition may be packaged, and the fluid composition may be introduced to impregnate the fluid carrier 30 subsequently, followed by sealing the filling opening and freezing. Thereafter, the temperature monitors are stored under conditions rendering the fluid composition immobile until ready for use. In a further alternative, the fluid composition is not immobilized, but the monitor 20 is assembled with the composition in the fluid state and applied to a product for monitoring its subsequent temperature history.

In use, a monitor 20 is placed on each object to be monitored, with the backing 32 in contact with a surface and in heat transmitting relation to the foodstuff or other goods. When the temperature of the fluid composition on the carrier rises above its freezing or immobilization point, which is predetermined to relate to the condition of the goods, the composition thaws or becomes fluid and commences to travel or flow into the absorption zones 40 of the absorbent layer 26. In case the composition initially is in the fluid state, it commences to flow immediately. The fluid continues to flow along the path defined by the cross-section of the absorbent layer, in the direction of the indicating area 36, substantially as indicated by the fluid front or wave lines 52 and arrows in FIG. 6. The rate of travel is a function of the concentration of the flow retardant in the fluid composition and of the temperature of the composition, increasing with decreasing concentration and increasing temperature. The positions of the liquid fronts 52 at any time thus are dependent both upon the temperature history of the fluid composition and the elapsed time at temperatures which render the composition mobile. Since the composition is in heat transmitting relation to the goods, the positions of the liquid fronts likewise are functions of the elapsed time above a corresponding predetermined temperature of the goods and of the temperatures experienced. When the temperatures drop to the immobilization point of the fluid composition, the liquid fronts remain stationary. The monitor thus has "memory" characteristics, and the indicating process is irreversible. The coded openings 46 may be inspected periodically to observe the progress of the fluid. Each time the predetermined temperatures for the goods and the fluid composition are exceeded, the liquid fronts 52 advance further in the direction of the indicating area 36. Should the goods experience ultimately the predetermined combination of time and temperature for which the monitor is calibrated, the liquid fronts 52 reach the indicating area 36 and effect a sharp color change thereof. This change likewise is irreversible and furnishes a permanent record of the temperature history of the goods.

The invention is especially advantageous when employed to monitor the temperature history of frozen foodstuffs, which may be packaged in conventional ways such as illustrated in FIGS. 13–15. For example, it may be desired to indicate when the foodstuff has exceeded a certain surface temperature, e.g., its thawing temperature. In such case, the fluid composition is compounded to thaw at a corresponding temperature, which takes into account the heat transfer conditions. Where a rapid indication is desirable, the flow retardant may be omitted from the fluid composition. Also in such case, a simplified form of the monitor may be used, such as illustrated in FIGS. 4 and 5, described subsequently. Should it be desired to extend the time before indication, in case the goods properly may experience the predetermined temperature for a certain period of time, the flow retardant is employed and adjusted to provide the desired time lag. Similarly, the temperature of a product may be monitored above or below its freezing point or of parts thereof. Thus, some products may be preserved satisfactorily within prescribed limits above their freezing points, and others must be maintained well below their freezing points if they are to be preserved for substantial periods of time. The invention is especially useful with frozen food products, many of which should not be frozen once thawed, and should be consumed shortly after thawing. Also, certain frozen foods such as poultry and fish have relatively limited storage lives, and these and other products must be refrigerated at low temperatures in order to preserve them. The invention provides a record of the temperature history from the time of freezing up to consumption, warning each agency handling the goods in turn and ultimately the consumer when the prescribed conditions have been exceeded prior to receipt or during handling and storage.

FIGS. 4 and 5 illustrate a temperature monitor 54 of very simple and economical construction which may be employed to provide an instantaneous indication of excessive temperature. The monitor includes the cover 22, the absorbent layer 26, the fluid carrier 30, and the backing 32, secured to the cover with adhesive 34. As before, the cover 22 preferably is not adhered to the upper surface of the absorbent layer 26, so as to provide a venting space 50 above the absorbent layer. The fluid composition is required to penetrate only the thickness of the absorbent layer, and the color of the upper surface thereof changes rapidly when the prescribed temperature is exceeded. On the other hand, if it be desired to provide a time lag, it may be accomplished in the same manner as with the preceding embodiment, by incorporating a flow retardant in the fluid composition. Again, the rate of flow may be dependent on the temperature.

FIG. 4 also illustrates the provision of the legends "FROZEN" and "THAWED," which may be imprinted on the surface of the absorbent layer 26 or on the cover 22. The word "FROZEN" may be printed in the same color as the indicating color material and in contrasting color to the absorbent layer. The word "THAWED" may be printed in the same color as the absorbent layer and in contrasting color to the coloring material. So long as the goods are below their freezing point, the word "FROZEN" is prominent and provides assurance for individuals concerned with the condition of the goods. When the goods thaw and a color change takes place, the word "THAWED" stands out to provide an additional warning indication, and the word "FROZEN" is merged in the colored background. Similarly, the embodiment of FIGS. 1–3 may have suitable legends over the indicating area 36.

FIGS. 6 and 7 illustrate the provision of the coloring material on the back or under surface of the absorbent layer 26. In FIG. 6, the back is provided with a coat 56 of coloring material, which may be painted thereon and dried in the process of manufacture. In FIG. 7, the back of the absorbent layer 26 is provided with two transverse bands 58 of coloring material, preferably arranged slightly in advance of the indicating area 36. As the fluid composition travels through the absorbent layer 26 in the manner shown in FIG. 6, the coloring material is dissolved therein and dispersed through the absorbent layer, and conducted by the fluid to the indicating area. The advantages of this modification include the ultimate obtainment of a very strong band of color at the indicating area. The color tends to be more concentrated at the liquid fronts 52, and any tendency towards fractionation of the coloring material during its travel is obviated. Also, the coloring material need not be compounded with the fluid composition. The back side of the absorbent layer need only be provided with the narrow bands 58 of coloring material shown in FIG. 7, if such be preferred.

Figure 8:
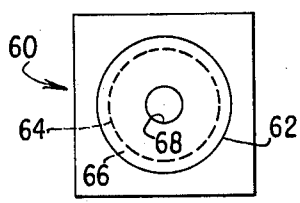
FIG. 8 is a top plan view of another embodiment of the temperature monitor.

FIG. 8 illustrates a temperature monitor 60 provided with circular indicating elements otherwise constructed in the manner of the monitor 20 shown in FIGS. 1–3. The peripheral margins of the absorbent layer and of the masking layer thereover are indicated at 62, and the recessed peripheral margin of the impermeable layer is indicated at 64. The peripheral margin of the fluid carrier coincides with the margin of the absorbent layer, so that an annular absorption zone is provided on the absorbent layer, as indicated at 66. The masking layer has a central circular opening 68 which defines a central indicating area. In the process of indicating, the fluid composition flows radially from the peripheral margin of the absorbent layer, and provides a color indication when it reaches the indicating area.

FIGS. 9 and 10, and 11 and 12 illustrate respective temperature monitors 68 and 70 having graduated scales which serve to indicate the time-temperature experience from the time they commence to function until the cumulative experience reaches some predetermined point. FIGS. 9 and 11 show the monitors only in part. The monitor 68 of FIGS. 9 and 10 includes an absorbent strip 72 having a scale as represented therealong, having divisions numbered 1–5. A reservoir opening 74 is provided adjacent one end thereof and preceding the scale. The reservoir is covered and obscured by a masking strip 76 secured to the absorbent layer. A fluid composition 78 is provided in the reservoir, and held therein by the masking strip 76 and a backing 80. The backing is secured by suitable means to a transparent cover 82, and the backing and cover completely envelope and seal the remaining components. In this case, the monitor is assembled conveniently without using a fluid carrier such as the carrier 30 of the preceding embodiments.

The monitor 70 of FIGS. 11 and 12 is similar to the preceding embodiment 68, except that an absorbent strip 84 thereof is continuous, and a fluid carrier 86 is employed on the back side of the strip adjacent one end. Such construction may be desirable to provide additional fluid capacity in the device, employing as great a quantity or as many layers of carrier material as needed to hold an amount of fluid composition in excess of that necessary to saturate the absorbent 84.

FIGS. 13–15 illustrate the attachment of a temperature monitor 20 or 20′ on the container or wrapping of frozen food packages 88, 90, and 92, respectively. FIG. 13 illustrates an item of canned goods, which may be liquid or semi-solid when thawed. Alternatively, the container may hold a product which is stored in the fluid state, such as a beverage. FIG. 14 illustrates a frozen food carton, the contents of which may be solid or semi-solid when thawed.

FIG. 15 illustrates a poultry package, in which a turkey is encased in a Saran covering or the like. The temperature monitor 20′ may perform one of several functions, or a combination of monitors may be attached to perform a plurality of functions. Thus, for example, it is possible for parts of the turkey, particularly the breast, to become discolored at temperatures below those which produce thawing. The monitor may be applied to the breast to provide an indication of when such temperatures have been experienced. Additional monitors may be located to indicate temperature changes which would have other effects, such as a decrease in storage life or thawing.

In the illustrative embodiment, the monitor 20′ is attached on the surface of the wrapping 94 which tightly encases the bird. Alternatively, it may be desirable to place the monitor directly on the skin of the bird. In attaching the monitor to the wrapping, and similarly in such attachment to other packaging materials, the wrapping 94 may serve as the backing 32 illustrated in FIGS. 1–3. The fluid composition then is in closer proximity to the product. The attachment may take place in the process of wrapping the bird or thereafter, and the monitor may be prefrozen or frozen quickly with the bird. The monitor is very well adapted for manufacturing and attachment in conjunction with normal packaging operations.

The following are several examples illustrative of the invention, and it will be understood that the invention is not limited thereto, nor to the conditions, procedures, and proportions thereof.

In Examples 1 and 2, a temperature monitor was employed which was substantially the same as the monitor 20 of FIGS. 1–3, while having the layer 56 of coloring matter shown in FIG. 6. The cover 22 was polyethylene sheet material. The absorbent layer 26 was 100 lb. uncoated blotting paper 0.015 inch thick. The masking layer was a coat of hydrophobic black printing ink printed on the upper surface of the absorbent layer. The layer 56 of coloring matter was U.S. certified red food color painted on the under surface of the absorbent layer. A 2% aqueous solution of the food color was employed, containing fractional percentages of sodium benzoate and citric acid as preservatives. The impermeable layer 28 was cellophane tape having a layer of pressure sensitive adhesive on one surface thereof and adhered thereby on the color layer 56. The fluid carrier was five superimposed strips of surgical gauze having approximately 0.015 inch square openings. The backing 32 was cellophane tape having a layer of pressure sensitive adhesive on the inner surface thereof, and adhered thereby to the margin of the cover 22. The absorbent layer and the fluid carrier were 1 inch square, and the indicating area 36 was $\frac{3}{16}$ inch wide and centrally disposed. The impermeable layer 28 was $\frac{3}{4}$ inch wide, leaving absorption zones 40, $\frac{1}{8}''$ wide at each end of the absorbent layer.

The capacity of the absorbent layer 26 was about 0.3 cc. of fluid composition. The fluid carrier 30 was impregnated with 0.5 cc. of fluid composition. The fluid composition was compounded of water and aqueous polyvinyl acetate emulsion in the indicated proportions. The emulsion contained about 47% solids having a particle size of 2–8 microns. The viscosity of the emulsion was about 3500 by R. V. F. Brookfield Viscosimeter (spindle No. 3, 20 r.p.m., at 80° F.). The emulsion pH was from 4 to 5. At times, a freezing point depressant was employed. Ethanol was selected for its edible nature, and it was employed in the indicated proportions.

*Example 1*

The following aqueous alcoholic solutions were compounded to provide the indicated freezing points (F. P., ° F.):

| Solution No. | 80% Ethanol, cc. | Water, cc. | F.P., ° F. |
|---|---|---|---|
| 1 | 5 | 32.5 | 20 |
| 2 | 5 | 25 | 15 |
| 3 | 5 | 19 | 10 |

Polyvinyl acetate emulsion, as described above, was mixed with each of solutions 1, 2, and 3, in a proportion of 5 cc. of emulsion to 30 cc. of solution in each case, resulting in further lowering of the freezing points. Three compositions having different freezing points were provided in this manner, respectively numbered 1–3, each of which commences to indicate at a different temperature corresponding to its freezing point.

Temperature monitors were assembled using the compositions 1–3. The monitors were maintained at several different temperatures above the freezing points of the compositions. Their indication times were observed, being recorded when the indicating area 36 of the monitor 20 was completely colored. The results were as follows:

| Composition No. | Indication Time, mins. | | |
|---|---|---|---|
| | 20° F.[1] | 42° F.[1] | 78° F.[2] |
| 1 | 43 | 22 | 12 |
| 2 | 42 | 23 | 11 |
| 3 | | 22 | 11.5 |

[1] Monitors frozen and held at 0° F. until tested.
[2] Composition at same temperature at start of tests.

The compositions, having the same polyvinyl acetate concentrations, traveled at about the same rates at the same temperatures, the rates not differing substantially with the variations in ethanol concentration. The several ethanol concentrations provided for different desired low temperature characteristics in the vicinity of the respective freezing points.

*Example 2*

Fluid compositions were compounded with varying proportions of polyvinyl acetate, to provide compositions traveling at different rates at the same temperatures. A solution of 40 cc. of 95% ethanol and 60 cc. of water was made up and mixed in varying proportions with the above described polyvinyl acetate emulsion (PVA), as tabulated below, providing compositions freezing below 0° F.

Temperature monitors were assembled using the compositions, numbered 4–7. The compositions were at 88° F. initially. The indication time of each composition was observed at the same temperature, commencing with the time the composition was incorporated in the monitor. The results were as follows:

| Composition No. | Volume Ratio, PVA: Alcohol Solution | Time at 88° F., mins. |
|---|---|---|
| 4 | 1:6 | 10 |
| 5 | 1:5 | 15 |
| 6 | 1:4 | 23 |
| 7 | 1:3 | 42 |

Indication times increased similarly with increasing polyvinyl acetate concentration, varying over a number of hours, when the monitors were observed qualtatively at about 10° F. It was noted that composition No. 5, having an initial temperature of about 0° F., provided an indication time of about 155–170 minutes at the temperature of about 10° F.

The polyvinyl acetate concentration may be increased further to provide monitors having extended indication times for products which are maintained above freezing temperatures, such as dairy products including milk, butter, cheese, and eggs. Thus for example, compositions may be made up of the polyvinyl acetate emulsion and water in volume ratios of from 1:1 to 2:1, emulsion:water, to provide an indication after an extended period of time at refrigerator temperatures. Monitors may be assembled employing such compositions and attached to the products with the compositions in the fluid state, and they commence to function immediately.

*Example 3*

A temperature monitor was employed which was similar to the monitor 54 of FIGS. 4 and 5. The cover 22 was polyethylene sheet material. The absorbent layer 26 was 1 inch square blotting paper as in Examples 1 and 2. In place of the fluid carrier 30, a liquid reservoir was formed beneath the absorbent layer, similar to the reservoir 74 of FIGS. 9 and 10. The reservoir was provided by marginal strips of paper adhered to a pressure sensitive adhesive surface on cellophane tape. The reservoir was filled with fluid composition and the composition was frozen. The cellophane tape constituted the backing 32, and its margins were adhered to the cover, to seal the monitor package.

Fluid compositions having varying proportions of polyvinyl acetate were compounded of polyvinyl acetate emulsion, initially having characteristics comparable to the material employed in Examples 1 and 2. To the emulsion was added 3.6% aqueous U.S. certified red food color containing propylene glycol and tartaric acid as preservatives. Water was also added to one case. The compositions were as follows, in parts by volume:

| Composition No. | Color Solution | PVA Emulsion | Water |
|---|---|---|---|
| 8 | 8 | 80 | 22 |
| 9 | 8 | 102 | |
| 10 | 8 | 102 (Concentrated)[1] | |

[1] Initial emulsion dehydrated 10% by volume.

Temperature monitors containing the above compositions initially in the frozen state were maintained at the following temperatures. Their indication times were recorded when the color first appeared at the upper surface of the absorbent layer.

| Composition No. | Indication Time, mins. | |
|---|---|---|
| | 44° F. | 82° F. |
| 8 | 44 (43° F.) | 9 |
| 9 | 54 | 18 |
| 10 | 62 | 21.5 |

Indications are much more rapid with this type monitor. In the absence of the polyvinyl acetate, a color change takes place immediately upon thawing.

A preferred concentration of vinyl acetate polymer in the fluid composition is in the range of about 5% to 50% by weight, when practicing the invention according to the foregoing examples. It will be understood that the specific results obtained in the manner of the examples will vary, depending on the materials, procedures, and equipment which are employed. However, it has been found that with constant conditions, reproducible results are obtained which satisfy various temperature monitoring requirements.

While several preferred embodiments of the monitor have been described and illustrated, it will be apparent to those skilled in the art that numerous changes and modifications may be made within the spirit and scope of the invention. It is intended that such changes and modifications be included within the scope of the appended claims.

I claim:

1. A temperature monitor which comprises an absorbent body having an indicating area on a surface thereof, and a fluid composition for producing a visual indication at said indicating area, said fluid composition comprising an aqueous dispersion of polyvinyl acetate, said fluid composition being arranged for absorption by said absorbent body at a zone remote from said indicating area, said fluid composition traveling to said indicating area at a predetermined temperature and providing a visual indication thereat.

2. A monitor as defined in claim 1 wherein said fluid composition includes a freezing point depressant.

3. A monitor as defined in claim 1 wherein said polyvinyl acetate has a particle size of about 2–8 microns.

4. A temperature monitor which comprises an absorbent body having an indicating area on a surface thereof, a coloring matter remote from said indicating area, and an aqueous composition contacting said absorbent body at a zone remote from said indicating area and existing in an immobile state below a predetermined temperature and a fluid state thereat, said aqueous composition including a flow retardant of about 5% to 50% by weight of polyvinyl acetate emulsified therein, whereby said aqueous composition travels to said indicating area over a predetermined period of time when said temperature is reached therein and the composition is in a fluid state, said aqueous composition when in said fluid state conducting said coloring matter to said indicating area and indicating a color change thereat.

5. A monitor as defined in claim 4 wherein said polyvinyl acetate has a particle size of about 2–8 microns.

6. A temperature monitoring package which comprises a layer of absorbent paper having an indicating area on a surface thereof, and an adjacent layer remote from said indicating area and containing a fluid composition for producing a visual indication at said indicating area, said fluid composition comprising an aqueous dispersion of polyvinyl acetate, said fluid composition traveling to said indicating area at a predetermined temperature to provide a visual indication thereat.

7. A temperature monitoring package which comprises a layer of absorbent paper having an indicating area on a surface thereof, a subjacent layer including a fluid composition for producing a color change at said indicating area and an absorbant carrier therefor, said fluid composition comprising an aqueous dispersion of polyvinyl acetate, said fluid composition traveling to said indicating area at a predetermined temperature to indicate a color change thereat, and a barrier interposed between said layers and restricting flow therebetween to a predefined zone of the first-named layer, whereby said fluid composition travels progressively over said surface of the first-named layer.

8. A temperature monitoring package which comprises a strip of absorbent paper having an indicating area on a surface thereof, a coloring matter remote from said indicating area, a subjacent strip of absorbent material impregnated with an aqueous composition, said aqueous composition existing in an immobile state below a predetermined temperature and in a fluid state thereat, said aqueous composition when in said fluid state traveling to said indicating area and conducting said coloring matter thereto to indicate a color change thereat, said aqueous composition including a flow retardant of about 5% to 50% by weight of polyvinyl acetate having a particle size of about 2–8 microns emulsified therein, and a barrier interposed between said strips and restricting flow therebetween to a predefined zone of the first-named strip, whereby said aqueous composition travels progressively and at a predetermined rate over said surface of the first-named strip.

9. A monitoring package as defined in claim 8 and including enveloping outer layers of material impregnable to said aqueous composition, said indicating area being visible through one of said outer layers.

10. A food package having affixed in heat transmitting relation to its contents a monitoring package as defined in claim 9.

References Cited by the Examiner
UNITED STATES PATENTS

| | | | |
|---|---|---|---|
| 2,379,459 | 7/1945 | Schreiber et al. | 99—192 |
| 2,560,537 | 7/1951 | Andersen | 99—192 |
| 2,716,065 | 8/1955 | Beckett et al. | 99—192 |
| 2,850,393 | 9/1958 | Romito | 99—192 |

A. LOUIS MONACELL, *Primary Exaimner.*

D. DONOVAN, *Assistant Examiner.*